US010666507B2

(12) United States Patent
Lahiri et al.

(10) Patent No.: US 10,666,507 B2
(45) Date of Patent: May 26, 2020

(54) AUTOMATIC RECONFIGURATION OF DEPENDENCY GRAPH FOR COORDINATION OF DEVICE CONFIGURATION

(71) Applicant: Microsoft Technology Licensing, LLC, Redmond, WA (US)

(72) Inventors: Shayak Lahiri, Redmond, WA (US); Sean Anderson Bowles, Seattle, WA (US); Peter J. Kaufman, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 286 days.

(21) Appl. No.: 15/639,363

(22) Filed: Jun. 30, 2017

(65) Prior Publication Data

US 2019/0007263 A1    Jan. 3, 2019

(51) Int. Cl.
*G06F 15/177*    (2006.01)
*H04L 12/24*    (2006.01)
(Continued)

(52) U.S. Cl.
CPC ........ *H04L 41/0803* (2013.01); *G06F 11/079* (2013.01); *G06F 11/0793* (2013.01);
(Continued)

(58) Field of Classification Search
CPC ...... H04L 4/0803; H04L 67/34; G06F 11/079; G06F 11/0793; G06F 11/142; G06F 11/1433; G06F 11/2247; G06F 11/2257
(Continued)

(56) References Cited

U.S. PATENT DOCUMENTS 6,029,196 A    2/2000  Lenz
6,078,741 A *  6/2000  Ma ........................ H04L 41/024
                                                    703/24
(Continued)

FOREIGN PATENT DOCUMENTS

WO    2016049096 A1    3/2016

OTHER PUBLICATIONS

"International Search Report and Written Opinion Issued in PCT Application No. PCT/US2018/034006", dated Jan. 2, 2019, 11 Pages.
(Continued)

*Primary Examiner* — Imad Hussain
(74) *Attorney, Agent, or Firm* — Medley, Behrens & Lewis, LLC

(57) ABSTRACT

Various technologies described herein pertain to controlling reconfiguration of a dependency graph for coordinating reconfiguration of a computing device. An operation can be performed at the computing device to detect whether an error exists in the dependency graph for a desired configuration state. The dependency graph for the desired configuration state specifies interdependencies between configurations of a set of features. An error can be detected to exist in the dependency graph when the desired configuration state differs from an actual configuration state of the computing device that results from use of the dependency graph to coordinate configuring the set of features. Feedback concerning success or failure of the dependency graph on the computing device can be sent from the computing device to a configuration source. The dependency graph can be modified (by the computing device and/or the configuration source) based on whether an error is detected in the dependency graph.

20 Claims, 9 Drawing Sheets

(51) Int. Cl.
    *G06F 11/14*     (2006.01)
    *G06F 11/07*     (2006.01)
    *G06F 11/22*     (2006.01)
    *H04L 29/08*     (2006.01)

(52) U.S. Cl.
    CPC ........ *G06F 11/142* (2013.01); *G06F 11/1433* (2013.01); *G06F 11/2247* (2013.01); *G06F 11/2257* (2013.01); *H04L 67/34* (2013.01)

(58) Field of Classification Search
    USPC ......................................................... 709/220
    See application file for complete search history.

(56) References Cited

U.S. PATENT DOCUMENTS

| | | | | |
|---|---|---|---|---|
| 7,895,572 | B2* | 2/2011 | Stienhans | G06F 8/70 717/120 |
| 8,108,456 | B2* | 1/2012 | Chen | G06F 9/4856 709/202 |
| 8,566,819 | B2* | 10/2013 | Wookey | G06F 8/658 717/175 |
| 8,719,769 | B2* | 5/2014 | Castellanos | G06F 9/4494 717/104 |
| 8,954,311 | B2 | 2/2015 | Gupta et al. | |
| 9,003,222 | B2 | 4/2015 | Bhamidipaty et al. | |
| 9,081,638 | B2 | 7/2015 | Motta et al. | |
| 9,122,602 | B1* | 9/2015 | Jewell | G06F 11/079 |
| 9,223,683 | B1* | 12/2015 | Knych | G06F 11/3692 |
| 10,355,933 | B2* | 7/2019 | Bowles | H04L 41/0893 |
| 2003/0233431 | A1* | 12/2003 | Reddy | G06F 9/466 709/221 |
| 2004/0046785 | A1* | 3/2004 | Keller | G06F 9/5061 715/734 |
| 2004/0049372 | A1* | 3/2004 | Keller | H04L 41/06 703/22 |
| 2004/0177244 | A1 | 9/2004 | Murphy et al. | |
| 2007/0079113 | A1 | 4/2007 | Kulkarni et al. | |
| 2008/0016115 | A1 | 1/2008 | Bahl et al. | |
| 2010/0169720 | A1* | 7/2010 | Lumpp | G06F 11/2028 714/50 |
| 2011/0231836 | A1* | 9/2011 | Wookey | G06F 8/658 717/174 |
| 2013/0042154 | A1* | 2/2013 | Agarwal | G06F 11/3612 714/38.14 |
| 2013/0144999 | A1 | 6/2013 | Bubolz et al. | |
| 2015/0358198 | A1* | 12/2015 | Mahajan | H04L 41/082 709/221 |
| 2015/0358209 | A1* | 12/2015 | Zhang | H04L 41/0893 709/221 |
| 2016/0034258 | A1 | 2/2016 | Wijngaard et al. | |
| 2016/0094386 | A1* | 3/2016 | Kaufman | H04L 41/0806 |
| 2017/0289060 | A1* | 10/2017 | Aftab | H04L 67/1097 |
| 2018/0287872 | A1* | 10/2018 | Bowles | G06F 9/44505 |

OTHER PUBLICATIONS

Bu, et al., "A Reinforcement Learning Approach to Online Web Systems Auto-configuration", In Proceedings of 29th IEEE International Conference on Distributed Computing Systems, Jun. 22, 2009, pp. 2-11.

* cited by examiner

AUTOMATIC RECONFIGURATION OF DEPENDENCY GRAPH FOR COORDINATION OF DEVICE CONFIGURATION

BACKGROUND

One or more configuration sources (e.g., remote servers, remote agents) external to a computing device can configure features on the computing device. The features configured by the configuration source(s) can include policies, configuration profiles, resources (e.g., applications), and the like. For instance, features enforced on the computing device can be controlled to secure and manage the computing device. Configuration of the features by the configuration source(s) can be interdependent; yet, the features can be independently managed. By way of illustration, to cause a computing device to be in a desired configuration state, a first feature may be configured only after a second feature has been configured on the computing device, where the first and second features can be independently managed (e.g., a first configuration source can configure the first feature and a second configuration source can configure the second feature, the first feature and the second feature can be configured by unrelated subsystems of a configuration source).

Configuration source(s) conventionally can manage the dependencies between features. For instance, configuration source(s) can sequence communications with a computing device in such a way that the computing device is in a desired configuration state. According to an illustration where a configuration source negotiates dependencies between features to configure a data protection feature on a computing device, the configuration source can initially install a certificate on the computing device. The configuration source can wait for the installation of the certificate to complete, and once the certificate is installed, the configuration source can install a virtual private network (VPN) profile on the computing device. Again, the configuration source can wait for the VPN profile installation to complete, and then the data protection feature can be configured by the configuration source. However, connectivity between configuration source(s) and a computing device may be unreliable, so it may be difficult for the configuration source(s) to synchronize with the computing device and manage configuration state transitions. Moreover, it may be difficult to coordinate configuration in such a way to guarantee correct configuration state, since enforcement and/or implementation of configuration can be dictated by components on the computing device. For instance, while a computing device may successfully receive a configuration from a configuration source, the computing device may not enforce the configuration in a desired manner, which adds to complexity of conventional approaches. Additionally, coordination of configuration can be made more difficult since dependencies between features may vary between device types, change when conditions are altered, or generally be unknown.

SUMMARY

Described herein are various technologies that pertain to controlling reconfiguration of a dependency graph for coordinating reconfiguration of a computing device. An operation can be performed at the computing device to detect whether an error exists in the dependency graph for a desired configuration state. The dependency graph for the desired configuration state can specify interdependencies between configurations of a set of features. An error can be detected to exist in the dependency graph when the desired configuration state differs from an actual configuration state of the computing device that results from use of the dependency graph to coordinate configuring the set of features. Moreover, feedback concerning success or failure of the dependency graph on the computing device can be sent from the computing device to a configuration source. For example, when an error is detected in the dependency graph for the desired configuration state, a source of the error can be identified in the dependency graph, and feedback sent to the configuration source can include an indication of the source of the error detected in the dependency graph. Further, the dependency graph can be modified (e.g., by the computing device and/or the configuration source) based on whether an error is detected to exist in the dependency graph.

According to various embodiments, when an error is detected in the dependency graph for the desired configuration state, the dependency graph for the desired configuration state can be modified by the computing device to create a modified dependency graph for the desired configuration state. Moreover, an operation can be performed at the computing device to detect whether an error exists in the modified dependency graph for the desired configuration state. According to an example, the dependency graph can be iteratively modified by the computing device (e.g., up to a predefined maximum number of modification attempts can be performed by the computing device to try to create a successful modified dependency graph).

Pursuant to yet other embodiments, a dependency graph for a desired configuration state can be sent, from a configuration source, to a computing device enrolled in the configuration source. Feedback pertaining to the dependency graph can be received from the computing device at the configuration source. Moreover, the dependency graph can be modified by the configuration source based on the feedback received from the computing device to create a modified dependency graph for the desired configuration state. Further, the modified dependency graph for the desired configuration state can be sent to the computing device. It is also contemplated that the dependency graph can additionally or alternatively be modified by the computing device.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
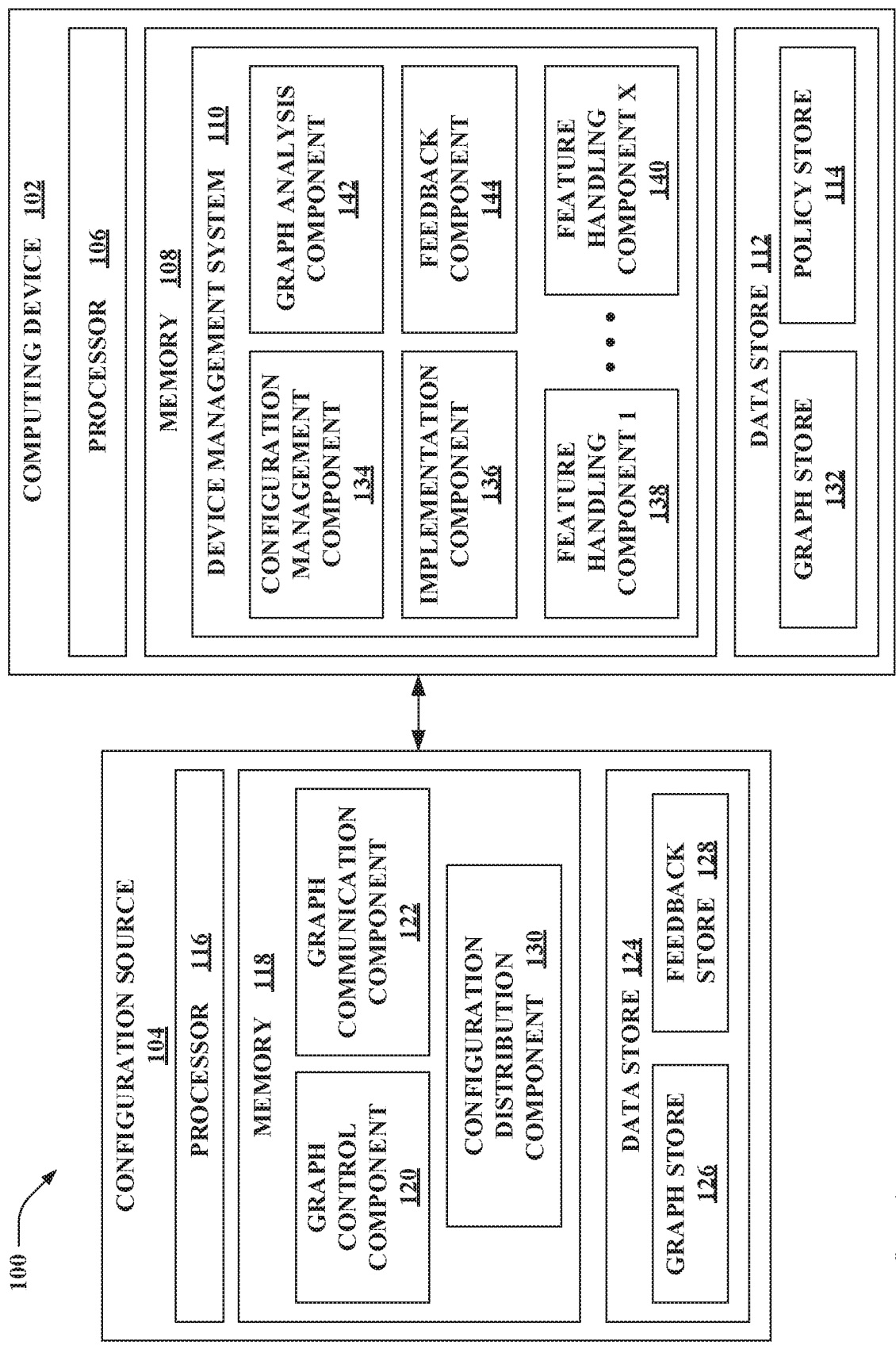
FIG. 1 illustrates a functional block diagram of an exemplary system that controls reconfiguring a dependency graph for coordinating configuration of a computing device.

Various technologies pertaining to automatically reconfiguring a dependency graph used for coordinating configuration of a computing device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that controls reconfiguring a dependency graph for coordinating configuration of a computing device 102. The system 100 includes the computing device 102 and a configuration source 104. The computing device 102 can be enrolled in the configuration source 104. Further, as described in greater detail herein, the configuration source 104 can transmit configuration requests to the computing device 102 that control enabling and/or disabling features on the computing device 102. The configuration requests can include values for policies, values for preferences, configuration profiles, and resources that can be applied to the computing device 102. While the system 100 is shown as including one configuration source 104, it is to be appreciated that the system 100 can include more than one configuration source; thus, it is contemplated that the computing device 102 can be concurrently enrolled in more than one configuration source.

The computing device 102 includes at least one processor 106 and memory 108. The processor 106 is configured to execute instructions loaded into the memory 108 (e.g., one or more systems loaded into the memory 108 are executable by the processor 106, one or more components loaded into the memory 108 are executable by the processor 106). As described in greater detail herein, the memory 108 includes a device management system 110 that controls configuring the computing device 102 based on configuration request(s) received from the configuration source 104. It is also contemplated that the device management system 110 can further control configuring the computing device 102 based on configuration request(s) received from one or more differing configuration sources (not shown); yet, the claimed subject matter is not so limited. The device management system 110 coordinates configuration of features on the computing device 102 based on dependencies between the features specified in a dependency graph, as opposed to relying on configuration source(s) (e.g., the configuration source 104 and/or any differing configuration sources) to manage such dependencies. Moreover, the device management system 110 can analyze the dependencies between the features to enable reconfiguration of the dependency graph used for coordinating configuration of the features; based on the analysis of the dependencies between the features (e.g., if a failure is detected when using the dependency graph), the dependency graph can be reconfigured. Thus, the dependency graph can be managed and updated (e.g., by the computing device 102, by the configuration source 104) when conditions change, when dependencies are discovered, when the computing device 102 is altered, if the computing device 102 is newly enrolled in the configuration source 104, or the like.

The computing device 102 further includes a data store 112. The data store 112 includes a policy store 114 that stores current values of policies that are enforced on the computing device 102. A current policy value of a policy can be retrieved from the policy store 114 (e.g., by other components of the computing device 102). Additionally or alternatively, a notification can be sent (e.g., to other components of the computing device 102) responsive to a change in a current policy value of a policy stored in the policy store 114. Accordingly, when a policy value for a policy is activated on the computing device 102, the policy value for the policy can be published in the policy store 114.

Various types of computing devices are intended to fall within the scope of the hereto appended claims. The computing device 102 can be a mobile computing device. Examples of a mobile computing device include a laptop computing device, a mobile telephone (e.g., a smartphone), a tablet computing device, a wearable computing device, a handheld computing device, a portable gaming device, a personal digital assistant, a portable all-in-one computing device, or the like. Pursuant to other examples, the computing device 102 can be a desktop computing device, a gaming console, an embedded computing device (e.g., connectable via the Internet of things (IoT)), and so forth.

Various types of configuration sources are intended to fall within the scope of the hereto appended claims. Moreover, although not shown in FIG. 1, the computing device 102 can concurrently enroll in more than one type of configuration source. The configuration source 104 can be or include a remote server or a remote agent external to the computing device 102. For instance, the configuration source 104 can be or include a type of enterprise device management server. An example of an enterprise device management server is a mobile device management (MDM) server. An MDM server can control and protect data and configuration settings on computing devices using over-the-air distribution of applications, data, and policy configuration requests. Moreover, other types of enterprise device management servers can provide remote control, patch management, software distribution, operating system deployment, network access protection, and inventory management for computing devices. Yet, the claimed subject matter is not limited to the foregoing examples, as other types of configuration sources are intended to fall within the scope of the hereto appended claims (e.g. the configuration source 104 can be or include a messaging server, a document server, etc.). Moreover, although not depicted, it is contemplated that the computing device 102 can further include an internal configuration source (e.g., an application executed by the processor 106 of the computing device 102 can send configuration request(s) to the device management system 110). Thus, the examples set forth herein can be extended to a scenario where the computing device 102 includes an internal configuration source in addition to or instead of the configuration source 104.

Additionally, the configuration source 104 includes at least one processor 116 and memory 118. The processor 116 is configured to execute instructions loaded into the memory 118 (e.g., one or more systems loaded into the memory 118 are executable by the processor 116, one or more components loaded into the memory 118 are executable by the processor 116). The memory 118 of the configuration source 104 can include a graph control component 120 and a graph communication component 122. The graph control component 120 can manage a dependency graph for a desired configuration state for the computing device 102. The dependency graph for the desired configuration state can specify interdependencies between configurations of a set of features; accordingly, the dependency graph can specify an order in which the features in the set are to be configured to enable reaching the desired configuration state (e.g., at least one feature in the set is to be configured prior to enabling a dependent feature in the set to be configured). The features in the set can be independently managed (e.g., by different vendors, by different independent subsystems of the configuration source 104, by different configuration sources). Moreover, the graph communication component 122 can send the dependency graph for the desired configuration state to the computing device 102 and/or receive feedback pertaining to the dependency graph for the desired configuration state from the computing device 102. It is also contemplated that the graph control component 120 can manage dependency graphs for other desired configuration states for the computing device 102 and/or can manage dependency graphs for other computing devices. Additionally, it is to be appreciated that the graph communication component 122 can send other dependency graphs to the computing device 102, receive feedback pertaining to the other dependency graphs from the computing device 102, send dependency graphs to other computing devices, and/or receive feedback pertaining to the dependency graphs from the other computing devices.

The configuration source 104 can further include a data store 124. The data store 124 can include a graph store 126 that stores the dependency graphs managed by the graph control component 120 and distributed from the configuration source 104 by the graph communication component 122. The graph store 126 can store dependency graphs for various desired configuration states. Moreover, the graph store 126 can store dependency graphs for various types of computing devices (e.g., various classes of computing devices). For instance, a dependency graph in the graph store 126 can be for a particular device type—desired configuration state pair. Further, the data store 124 can include a feedback store 128 that stores feedback pertaining to the dependency graphs received from the computing devices.

The graph control component 120 can add, delete, modify, replace, etc. dependency graphs in the graph store 126 over time. According to an example, the graph control component 120 can modify a dependency graph in the graph store 126 based on feedback pertaining to the dependency graph received from the computing device 102 (e.g., the feedback can be retrieved by the graph control component 120 from the feedback store 128). By way of another example, feedback pertaining to a dependency graph received by the graph communication component 122 from the computing device 102 can include an updated dependency graph generated by the computing device 102. Following this example, the graph control component 120 can manage adding the updated dependency graph to the graph store 126 or replacing the dependency graph with the updated dependency graph in the graph store 126. For instance, the graph control component 120 can confirm that the updated dependency graph should be included in the graph store 126, confirm that the updated dependency graph should be utilized by the computing device 102, and/or confirm that the updated dependency graph should be utilized by other computing devices (e.g., utilized by a particular type of computing device). Moreover, it is contemplated that the graph control component 120 can further modify the updated dependency graph received from the computing device 102 (e.g., the updated dependency graph as further modified by the graph control component 120 can be stored in the graph store 126).

Dependencies between features can vary across different types of computing devices; accordingly, the graph control component 120 can manage the dependency graphs utilized by the different types of computing devices. By way of illustration, the graph control component 120 can cause a first dependency graph for a data protection feature to be utilized by the computing device 102 and a second dependency graph for the data protection feature to be utilized by a differing computing device, where the computing device 102 and the differing computing device are different types of computing devices. Following this illustration, for instance, the first and second dependency graphs can specify different orders in which features are to be configured, the first and second dependency graphs can specify different sets of features to be configured prior to enabling the data protection feature, or the like. Thus, the graph communication component 122 can send the first dependency graph for the data protection feature to the computing device 102 and the second dependency graph for the data protection feature to the differing computing device.

Moreover, the memory 118 of the configuration source 104 can include a configuration distribution component 130 that transmits configuration requests to the computing device 102. The configuration requests can be sent by the configuration distribution component 130 of the configuration source 104 to cause features to be configured on the computing device 102. The features configured by the configuration distribution component 130 of the configuration source 104 (as well as any other configuration source(s)) can include policies, configuration profiles, resources (e.g., applications), and the like. The configuration of features by the configuration source 104 (as well as any other configuration source(s)) can be interdependent. A dependent feature is a feature that is dependent on a state of one or more other features. For example, a dependent policy or setting can only be enabled on the computing device 102 if other features (upon which the dependent policy or setting depend) are set on the computing device 102 as specified in a corresponding dependency graph. To cause features to be configured on the computing device 102, the configuration distribution component 130 of the configuration source 104 (as well as any other configuration source(s)) can transmit configuration requests to the computing device 102. The configuration requests can include configuration data for features to be enabled on the computing device 102. Configuration data for a feature, for example, can include at least one of a policy value, a certificate, a profile, or a setting for the feature. Moreover, a configuration request can be a Synchronization Markup Language (SyncML) message, an Extensible Markup Language (XML) message, or the like; yet, other formats are intended to fall within the scope of the hereto appended claims. A protocol (e.g., Open Mobile Alliance (OMA) Device Management (DM)) used for the configuration requests sent from the configuration source 104, however, may not allow for combinatorically linking configurations of features; rather, the techniques set forth herein allow for the device management system 110 to manage relations between features.

The data store 112 of the computing device 102 can further include a graph store 132. The graph store 132 can store the dependency graph(s) received by the computing device 102 (e.g., from the configuration source 104 and/or other configuration sources). As described herein, one or more of the dependency graph(s) stored in the graph store 132 can be reconfigured over time. For instance, if a dependency in a particular dependency graph is identified as being incorrect (e.g., an error indicative of the incorrect dependency is detected by the computing device 102), then the particular dependency graph can be reconfigured (e.g., by the computing device 102, by the configuration source 104).

Conventionally, configuration source(s) manage an order at which configuration requests reach a computing device. Such traditional management can be difficult at best, due to connectivity issues between the configuration source(s) and the computing device, actual states of features on the computing device differing from anticipated states assumed by the configuration source(s), and so forth. With conventional management techniques, a dependent feature can be misconfigured, which can detrimentally impact user experience. In contrast, a dependency graph as described herein can specify rules for applying configurations of features when preconditions are satisfied. Moreover, as factors change which impact interdependencies between configurations of features in a dependency graph, the dependency graph can be reconfigured by the computing device 102 and/or the configuration source 104.

Use of a dependency graph for a desired configuration state stored in the graph store 132 by the computing device 102 is now described. The configuration source 104 (e.g., the configuration distribution component 130) can transmit a configuration request to the computing device 102. The configuration request can include configuration data for a dependent feature in the set of features specified in the dependency graph for the desired configuration state; thus, the configuration source 104 can attempt to configure the dependent feature by sending the configuration request. Moreover, the computing device 102 can receive the configuration request that includes the configuration data for the dependent feature.

Subsequent to receiving the configuration request that includes the configuration data for the dependent feature, the device management system 110 can evaluate whether preconditions for enabling the dependent feature specified in the dependency graph for the desired configuration state are satisfied. The dependency graph can specify the interdependencies between configurations of a set of features such that at least one feature in the set of features is to be configured prior to enabling the dependent feature to be configured. The device management system 110 can configure the dependent feature based on the configuration data when the preconditions for enabling the dependent feature specified in the dependency graph are satisfied. Further, the device management system 110 can prohibit the configuring of the dependent feature based on the configuration data prior to the preconditions for enabling the dependent feature specified in the dependency graph being satisfied.

More particularly, the device management system 110 includes a configuration management component 134, an implementation component 136, and a plurality of feature handling components, namely, a feature handling component 1 138, . . . , and a feature handling component X 140, where X can be substantially any integer greater than one (collectively referred to herein as feature handling components 138-140). While the device management system 110 is described herein as including more than one feature handling component 138-140, it is to be appreciated that the device management system 110 can alternatively include one feature handling component.

The configuration management component 134 can manage operations on the feature handling components 138-140. By way of illustration, the configuration management component 134 can cause the feature handling component 1 138 to set a feature responsive to receiving a configuration request that includes configuration data for such feature (e.g., the configuration management component 134 can identify that the feature is handled by the feature handling component 1 138 and can send a command to set the feature to the feature handling component 1 138). Moreover, the feature handling components 138-140 are components at the computing device 102 that handle configuration requests for specific features. For instance, each feature can have a respective feature handling component. By way of illustration, the feature handling component 1 138 (a first plugin) can handle a first feature (e.g., a dependent feature) and the feature handling component X 140 (a second plugin) can handle a second feature (e.g., a particular feature in the set of features specified in the dependency graph to be configured prior to the dependent feature). Additionally or alternatively, a generic feature handling component (e.g., one of the feature handling components 138-140) can handle configuring a group of features (e.g., simple configuration settings can be handled by the generic feature handling component).

Moreover, the implementation component 136 can evaluate whether preconditions for a dependent feature specified in a dependency graph for a desired configuration state are satisfied. The implementation component 136 can evaluate whether the preconditions in the dependency graph are satisfied subsequent to the configuration request that includes the configuration data for the dependent feature being received at the computing device 102. Further, the dependent feature can be configured (e.g., by one of the feature handling components 138-140 as managed by the configuration management component 134) based on the configuration data when the implementation component 136 identifies that the preconditions for the dependent feature in dependency graph are satisfied. Otherwise, when the implementation component 136 identifies that the preconditions for the dependent feature in the dependency graph are unsatisfied, the configuration of the dependent feature can be prohibited. If the preconditions in the dependency graph are identified as being unsatisfied, the implementation component 136 can reevaluate whether the preconditions are satisfied subsequent to the computing device 102 later receiving another configuration request that includes configuration data for a different feature (e.g., from the configuration source 104 or a differing configuration source); if the preconditions for the dependent feature specified in the dependency graph are identified as being satisfied at this later time, the dependent feature can be configured. By way of example, a current policy value of a policy (e.g., the dependent feature) can be modified in the policy store 114 when the dependent feature is set based on the configuration data. Following this example, the current policy value of the policy remains unchanged in the policy store 114 prior to the implementation component 136 identifying that the dependency graph for the dependent feature is satisfied.

The implementation component 136 coordinates configuring a set of interrelated features based on the dependency graph regardless of an order in which configuration requests for the interrelated features are received from the configuration source 104 (and/or any other configuration source(s)). Thus, policies configured at different times and/or by different configuration sources can be coordinated by the implementation component 136. Policies and device information can be utilized to determine whether the implementation component 136 can advance through the dependency graph.

The device management system 110 can coordinate independent features into a synthetic feature or policy state (e.g., a desired configuration state), which can be described by a dependency graph. State transitions for the independent features are managed by the feature handling components 138-140 (e.g., separate plugins on the computing device 102). The state transitions for the features can be used by the device management system 110 to determine a synthetic state of the computing device 102. Thus, multiple, unrelated configuration endpoints (e.g., the feature handling components 138-140) controlled by independent subsystems can contribute to a higher order, combined configuration state of the computing device 102; the combined configuration state can be utilized by the implementation component 136 to determine whether a dependent feature can be configured on the computing device 102.

The device management system 110 coordinates configuration of features to enable such features to be implemented as intended. A dependency graph can specify a predefined order for configuring features in a set. Configuration data for features can be pushed from the configuration source 104 (and/or other configuration source(s)), and the dependency graph can be employed by the device management system 110 to control implementing such features on the computing device 102. Moreover, as described herein, the dependency graph can be reconfigured.

According to an example, the device management system 110 can be part of an operating system of the computing device 102 (e.g., the memory 108 can include the operating system and the operating system can include the device management system 110). Pursuant to another example, the device management system 110 can be a third-party system that integrates with the operating system of the computing device 102.

Figure 2:
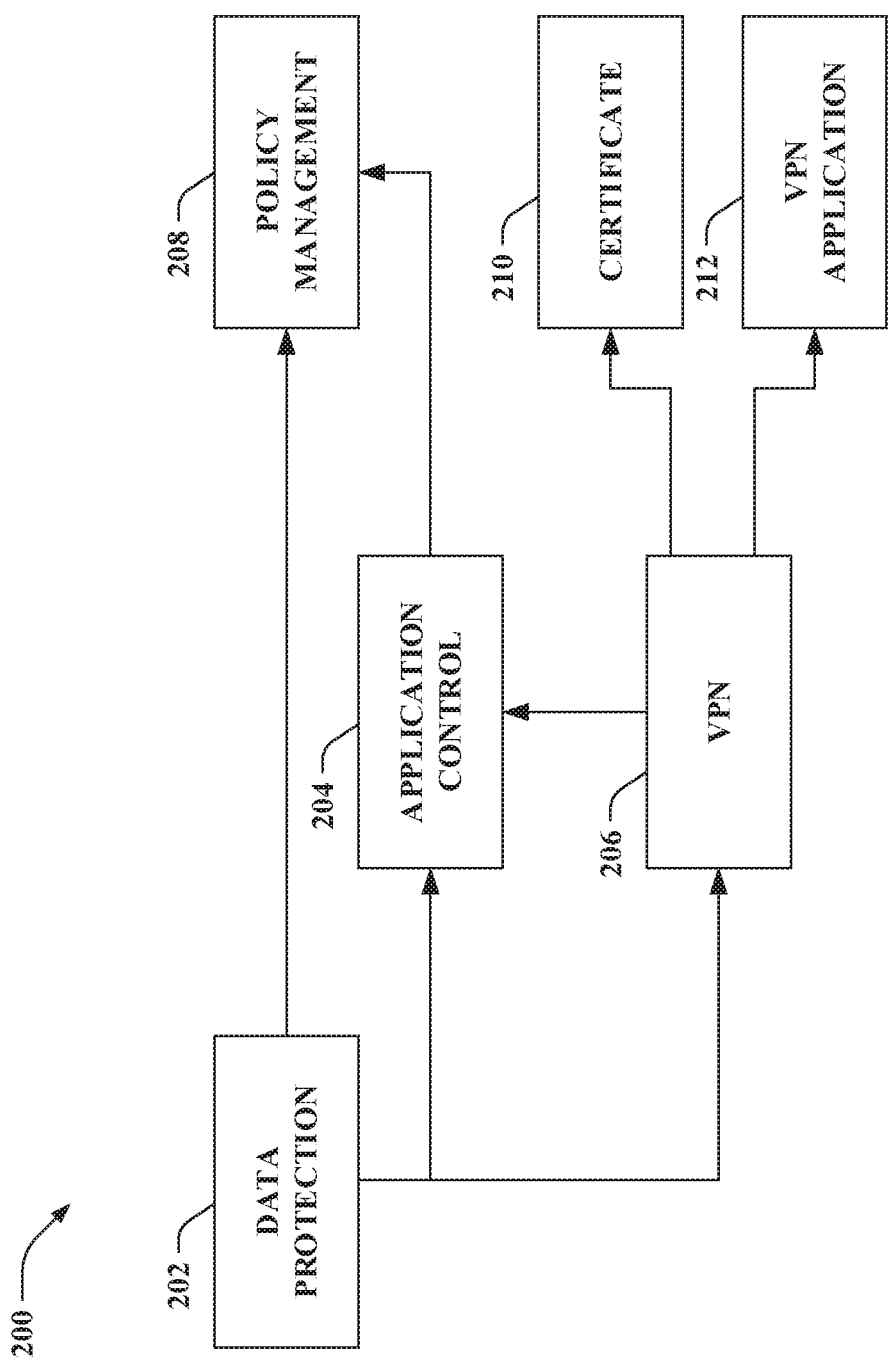
FIG. 2 illustrates an exemplary dependency graph for a desired configuration state, namely, a state in which a data protection feature in enabled.

Turning now to FIG. 2, illustrated is an exemplary dependency graph 200 for a desired configuration state, namely, a state in which a data protection feature 202 in enabled. When active on a computing device, the data protection feature 202 can separate applications and data for work from personal applications and data, as well as protect the applications and data for work. The dependency graph 200 is provided for illustration purposes; it is contemplated that differing dependency graphs are intended to fall within the scope of the hereto appended claims. For instance, dependency graph(s) for other desired configuration states are intended to fall within the scope of the claims. Moreover, other dependency graph(s) for the data protection feature that include a different set of dependencies are intended to fall within the scope of the claims (e.g., one or more of the dependencies shown in the dependency graph 200 of FIG. 2 can be removed, one or more dependencies can be added to the dependency graph 200, an order in which features are to be applied can differ). Additionally, it is contemplated that the dependency graph 200 can be reconfigured or a differing version of the dependency graph 200 may have been reconfigured to result in the version of the dependency graph 200 shown in FIG. 2.

As depicted in the example provided in FIG. 2, the data protection feature 202 is dependent on an application control feature 204, a VPN feature 206, and a policy management feature 208. Moreover, the VPN feature 206 is dependent on a certificate 210 and a VPN application 212. Thus, pursuant to this example, the application control feature 204 (e.g., application control rules), the VPN feature 206 (e.g., a VPN profile based on the certificate 210 and the VPN application 212), and the policy management feature 208 (e.g., policy management policies) are to be configured prior to the data protection feature 202 (e.g., a data protection policy) being configured on a computing device (e.g., to activate data protection on the computing device).

A remote management infrastructure (e.g., the configuration source 104) can be utilized to configure the features specified in the dependency graph 200. The subsystems that cause the features to be configured can be independent and unrelated. By way of illustration, a first configuration request received by a computing device (e.g., the computing device 102) can be utilized to configure the data protection feature 202, and a second configuration request received by the computing device can be utilized to configure the application control feature 204. Moreover, it is conventionally difficult to express the interrelatedness of the features or to enforce desired values across these features. For example, a master on/off switch for the data protection policy (e.g., the data protection feature 202) can be a single policy value that can be sent as part of a configuration request. However, if the data protection policy were to be activated on the computing device in response to receiving the single policy value (without considering whether the remaining feature described in the dependency graph 200 were previously configured), the data protection policy may not appropriately operate (e.g., since one or more of the remaining features described in the dependency graph 200, upon which the data protection policy is dependent, may not be configured).

Reference is again made to FIG. 1, and reconfiguration of a dependency graph for a desired configuration state is now described in greater detail. The system 100 enables a dependency graph to be automatically reconfigured. Dependencies for a dependency graph can be automatically discovered and reordered by the configuration source 104 and/or the computing device 102. For instance, a dependency graph can be reconfigured when conditions change, when an environment that includes the computing device 102 and/or the configuration source 104 is altered, if the computing device 102 is a new type of computing device (e.g., the graph store 126 lacks a dependency graph for a desired configuration state for the type of computing device), if hardware of the computing device 102 is added, removed, or replaced, if software of the computing device 102 is added, removed, upgraded, or patched (e.g., operating system upgrade, etc.), or the like. It is contemplated that modification of the dependency graph can be automatically triggered (e.g., responsive to detection of a condition change, alteration in the environment, enrollment of a new type of computing device, hardware or software modification), initiated by an administrator, periodically performed, or the like.

The system 100 enables use of dependency graphs to be scalable across various types of computing devices with various desired configuration states. Without the dependency graph reconfiguration described herein, explicit understanding of the dependencies would be needed to declare the dependency graphs to express combined configuration states, which can be difficult and time consuming. In contrast, the techniques set forth herein enable dependency graphs for desired configuration states to be reconfigured without explicit action on the part of IT administrators, without operating system updates, or the like.

According to an illustration, a seed dependency graph for a desired configuration state (also referred to herein as an initial dependency graph) can be used to automatically reconfigure dependency graphs for various types of devices. The reconfigured dependency graphs can be created based on the seed dependency graph, and can have new, expanded, reordered, or reduced sets of dependencies. Moreover, it is contemplated that the configuration source 104 and/or the computing device 102 can use more than one dependency graph for a desired configuration state, in a fallback mechanism, to achieve the desired configuration state (e.g., the computing device 102 can abort and use a fallback dependency graph when a differing dependency graph cannot be modified to reach a desired configuration state).

For example, once a correct dependency graph for a desired configuration state is created (e.g., as reconfigured by the computing device 102 and/or the configuration source 104), such dependency graph can be stored in the graph store 126 of the configuration source 104. For instance, if the dependency graph is reconfigured by the computing device 102, the reconfigured dependency graph can be pushed back to the configuration source 104 to allow the graph control component 120 to associate the reconfigured dependency graph in the graph store 126 with a particular device type—desired configuration state pair. Moreover, the reconfigured dependency graph stored in the graph store 126 can be subsequently distributed by the graph communication component 122 to other computing devices (e.g., the particular type of device corresponding to the reconfigured dependency graph).

The device management system 110 of the computing device 102 can further include a graph analysis component 142 and a feedback component 144. The graph analysis component 142 can detect whether an error exists in a dependency graph for a desired configuration state that causes a configuration to fail. For instance, an error is detected to exist in the dependency graph when the desired configuration state differs from an actual configuration state of the computing device 102 that results from use of the dependency graph to coordinate configuring the set of features. If an error exists in the dependency graph, the graph analysis component 142 can identify a source of the error in the dependency graph. Thus, when the computing device 102 uses the dependency graph, the graph analysis component 142 can learn a part in a sequence specified in the dependency graph at which a failure is encountered (e.g., errors can be outputted by the feature handling component 138-140). The graph analysis component 142 can analyze the dependency graph utilizing information that expresses how to determine if dependencies are being met. Such information enables the graph analysis component 142 (as well as the graph control component 120 of the configuration source 104) to detect fulfillment or failure of a configuration using the dependency graph as well as effects of modifications to the dependency graph. For instance, various subsystems that express dependencies between features can also express how to determine whether the dependencies are being met in a format that can be consumed by the graph analysis component 142 (and the graph control component 120). Moreover, the feedback component 144 can send feedback concerning the dependency graph to the configuration source 104. The feedback component 144 can provide a feedback mechanism between the computing device 102 and the configuration source 104 to indicate failure points in the dependency graph currently being used and deployed. Accordingly, the feedback component 144 enables the computing device 102 to provide feedback to the configuration source 104 concerning success or failure of the dependency graph on the computing device 102.

By way of illustration, the computing device 102 can be enrolled in the configuration source 104 and can have a dependency graph for a desired configuration state that specifies interdependencies between configurations of a set of features in the graph store 132. The dependency graph may have been received from the configuration source 104 (e.g., the graph communication component 122 of the configuration source 104 may have sent the dependency graph to the computing device 102). However, it is also contemplated that the dependency graph may have been received from a differing configuration source, generated or updated by the computing device 102, received from a differing computing device, or the like. Further, the configuration distribution component 130 of the configuration source 104 (and/or differing configuration source(s)) can send configuration requests for the set of features specified in the dependency graph to the computing device 102. The implementation component 136 of the computing device 102 can use the dependency graph to coordinate configuring the set of features based on the configuration requests. When the dependency graph is used by the implementation component 136 to coordinate configuring the set of features, the graph analysis component 142 can detect whether an error exists in the dependency graph that causes the configuration to fail. The graph analysis component 142 can identify a source of the error in the dependency graph. For example, the source of the error in the dependency graph identified by the graph analysis component 142 can include a specific path in the dependency graph (e.g., a dependency between features in the dependency graph), a feature missing from the dependency graph, a feature improperly included in the dependency graph, or the like. It is also contemplated that more than one error source can be identified in the dependency graph. According to an example, if an error is detected in the dependency graph, the feedback component 144 can send feedback to the configuration source 104 that includes an indication of the existence of the error in the dependency graph, an indication of the source of the error detected in the dependency graph, a combination thereof, and so forth.

Moreover, it is also contemplated that the feedback component 144 can send feedback to the configuration source 104 indicating that the dependency graph causes successful configuration (e.g., no error is detected by the graph analysis component 142).

As noted above, the graph communication component 122 of the configuration source 104 can receive the feedback pertaining to the dependency graph, and such feedback can be stored in the feedback store 128. The graph control component 120 can modify the dependency graph in the graph store 126 based on the feedback pertaining to the dependency graph received from the computing device 102. Pursuant to an example, the graph control component 120 can use the modified dependency graph for a type of computing device; thus, the modified dependency graph can be sent by the graph communication component 122 to a new computing device of such type that enrolls in the configuration source 104. According to another example, the graph communication component 122 can send the modified dependency graph to the computing device 102, and the modified dependency graph can subsequently be utilized by the implementation component 136 to coordinate configuring the set of features specified in the modified dependency graph on the computing device 102. The modified dependency graph can again be evaluated by the graph analysis component 142 and feedback can again be sent by the feedback component 144 to the configuration source 104 (e.g., enabling the dependency graph to be iteratively tailored for the computing device 102); yet, the claimed subject matter is not so limited. Moreover, it is also contemplated that the feedback pertaining to the dependency graph stored in the feedback store 128 can be displayable on a display screen (e.g., enabling an administrator to identify an incorrect dependency in the dependency graph).

Figure 3:
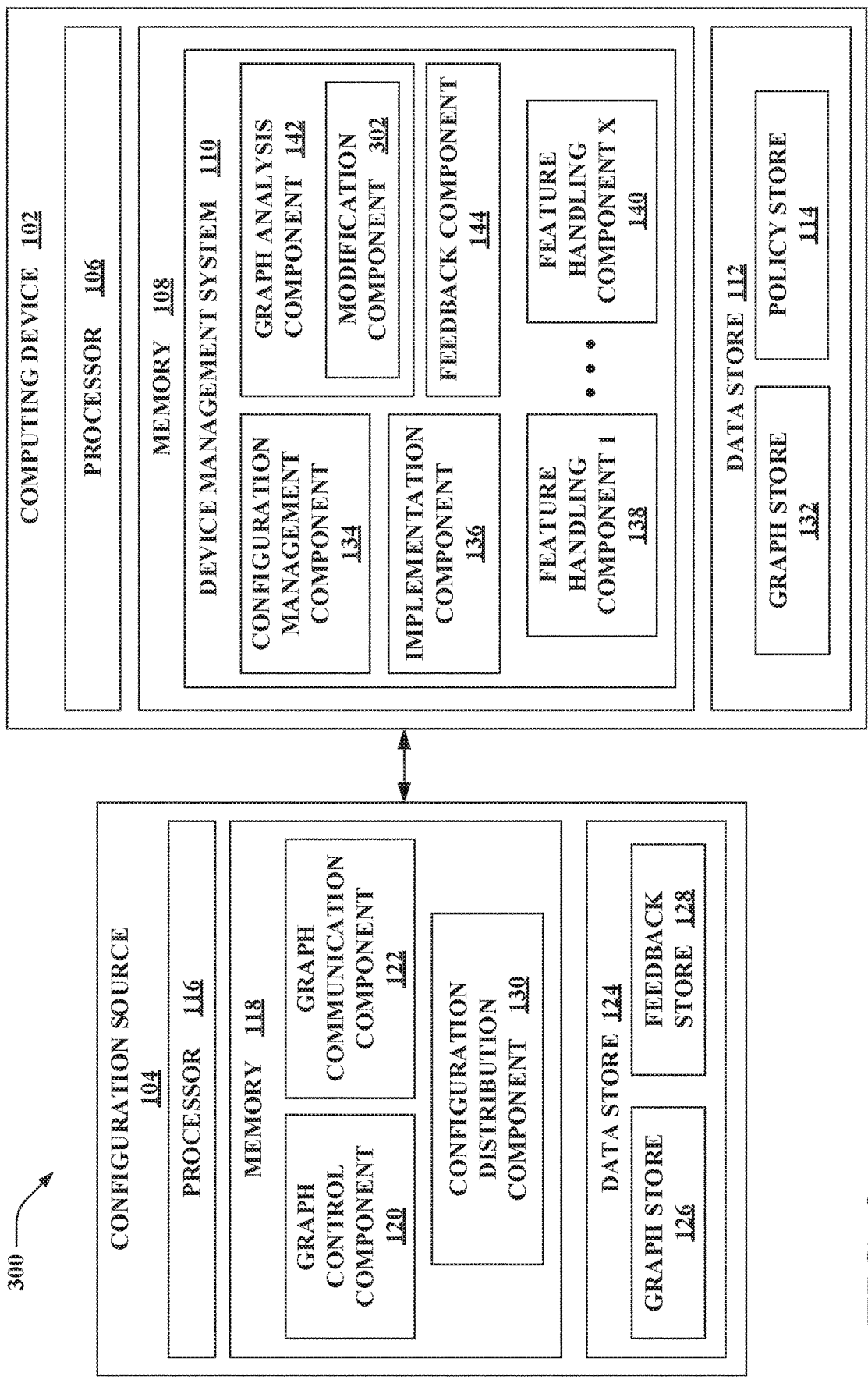
FIG. 3 illustrates a functional block diagram of another exemplary system that controls reconfiguring a dependency graph for coordinating configuration of the computing device.

With reference to FIG. 3, illustrated is another system 300 that controls reconfiguring a dependency graph for coordinating configuration of the computing device 102. The system 300 again includes the computing device 102 and the configuration source 104. In the example set forth in FIG. 3, the graph analysis component 142 of the computing device 102 further includes a modification component 302 that can modify a dependency graph for a desired configuration state. The modification component 302 can create the modified dependency graph based on self-learning; for example, the modification component 302 can employ machine learning to learn new dependencies to include in the modified dependency graph, identify non-applicable dependencies to remove from the modified dependency graph, reorder existing dependencies in the modified dependency graph, a combination thereof, and the like. The graph analysis component 142 can evaluate the modified dependency graph to observe an effect on success or failure of the configuration (e.g., the graph analysis component 142 can detect whether an error exists in the modified dependency graph for the desired configuration state that causes the configuration to fail). Moreover, the feedback component 144 can provide feedback to the configuration source 104 concerning the modified dependency graph for the desired configuration state; the feedback sent by the feedback component 144 can concern success or failure of the modified dependency graph created by the modification component 302 on the computing device 102. For example, the modification component 302 can attempt up to a predetermined number of modifications to the dependency graph.

The feedback sent by the feedback component 144 to the configuration source 104 can include the modified dependency graph, an indication of an existence of an error in the modified dependency graph, an indication of a source of the error detected in the modified dependency graph, alternate modifications of the dependency graph attempted by the modification component 142 and evaluated by the graph analysis component 142 and/or indications of sources of errors detected in such alternate modifications, a combination thereof, and so forth. The feedback sent by the feedback component 144 to the configuration source 104 can also include an indication of an existence of an error and/or an indication of a source of the error detected in a prior version of the dependency graph (e.g., from which the modified dependency graph was created by the modification component 302, an initial dependency graph for the desired configuration state received by the computing device 102 which was modified by the modification component 302).

If the graph analysis component 142 detects that the modified dependency graph is successful (e.g., no error is detected by the graph analysis component 142), then the modified dependency graph can be stored in the graph store 132 and/or the implementation component 136 can utilize the modified dependency graph to coordinate configuring the set of features specified in the modified dependency graph. For instance, the modified dependency graph can replace the prior version of the dependency graph for the desired configuration state in the graph store 132. Alternatively, both the modified dependency graph and the prior version of the dependency graph can be stored in the graph store 132 (e.g., the prior version of the dependency graph can be a fallback dependency graph for the desired configuration state). Moreover, if the graph analysis component 142 detects that the modified dependency graph is successful, then the feedback component 144 can push the modified dependency graph back to the configuration source 104 (e.g., for storage in the graph store 126, for distribution to other computing devices).

By way of illustration, the computing device 102 can be enrolled in the configuration source 104 and can have an initial dependency graph for a desired configuration state that specifies interdependencies between configurations of a set of features in the graph store 132. The initial dependency graph may have been received from the configuration source 104 (e.g., the graph communication component 122 of the configuration source 104 may have sent the initial dependency graph to the computing device 102). However, it is also contemplated that the initial dependency graph may have been received from a differing configuration source, generated or updated by the computing device 102, received from a differing computing device, or the like. Further, the configuration distribution component 130 of the configuration source 104 (and/or differing configuration source(s)) can send configuration requests for the set of features specified in the initial dependency graph to the computing device 102. The implementation component 136 of the computing device 102 can use the initial dependency graph to coordinate configuring the set of features based on the configuration requests. When the initial dependency graph is used by the implementation component 136 to coordinate configuring the set of features, the graph analysis component 142 can detect that an error exists in the initial dependency graph that causes the configuration to fail. The graph analysis component 142 can also identify a source of the error in the initial dependency graph. According to this illustration, the feedback component 144 can send feedback to the configuration source 104 that includes an indication of the existence of the error in the initial dependency graph, an indication of the source of the error detected in the initial dependency graph, a combination thereof, and so forth.

Moreover, the modification component 302 can trace through the initial dependency graph to determine modifications to the initial dependency graph (e.g., alternate paths compared to those specified in the initial dependency graph, removal or addition of features from a set of features specified in the initial dependency graph, a combination thereof) that can be considered. The graph analysis component 142 can evaluate modified dependency graph(s) (e.g., modified version(s) of the initial dependency graph). For instance, the graph analysis component 142 can utilize a mechanism that declares how to verify that a configuration is successful to evaluate the modified dependency graph(s). If a desired configuration state is reached for a particular modified dependency graph, then the graph analysis component 142 can commit the modified dependency graph to the computing device 102 and store the modified dependency graph in the graph store 132 (e.g., either replacing the initial dependency graph or storing both versions of the dependency graph). Moreover, the feedback component 144 can communicate with the configuration source 104 to send the modified dependency graph to the configuration source 104. Alternatively, if the desired configuration state is not reached, then the feedback component 144 can send feedback specifying the modified dependency graph(s) deemed to have failed when considered by the graph analysis component 142.

According to another illustration, the configuration source 104 can attempt to configure the computing device 102 by sending an initial dependency graph for a desired configuration state to the computing device 102 (e.g., from the graph store 126, sent by the graph communication component 122). However, the initial dependency graph can fail on the computing device 102; for instance, feedback that includes an indication of the existence of an error in the initial dependency graph and/or includes an indication of a source of the error detected in the initial dependency graph can be received by the graph communication component 122 from the computing device 102. Moreover, the graph communication component 122 can receive feedback from the computing device 102 specifying a modified dependency graph for the desired configuration state that is successful on the computing device 102. Pursuant to an example, the graph control component 120 can further update the modified dependency graph. Following this example, the modified dependency graph as further updated by the graph control component 120 can be sent back to the computing device 102 and/or sent to other computing device(s) by the graph communication component 122. However, it is to be appreciated that the modified dependency graph need not be further updated by the graph control component 120.

Following the above illustration, the graph control component 120 can correlate the modified dependency graph with other feedback received from the computing device 102 to analyze factors such as accuracy, efficiency and applicability of the modified dependency graph to other computing devices. Based on the analysis, the graph control component 120 can determine whether to replace the initial dependency graph in the graph store 126 with the modified dependency graph for other computing devices (or a subset thereof) and/or continue to associate the initial dependency graph with the other computing devices (or a subset thereof) (e.g., the modified dependency graph and the initial dependency graph can be modified by the other computing devices). For instance, the graph control component 120 can determine whether to use the initial dependency graph and/or the modified dependency graph for a class of devices (e.g., a particular device type) that includes the computing device 102. The graph control component 120 can also determine whether to use the initial dependency graph and/or the modified dependency graph for a differing class of devices (e.g., a differing device type) that differs from a class of devices that includes the computing device 102.

For example, a modified dependency graph for a desired configuration state can be identified as being successful for the computing device 102 (e.g., no error is detected by the graph analysis component 142). Moreover, a class of computing devices can include the computing device 102 and at least one different computing device. Following this example, the graph control component 120 can identify the at least one different computing device as being in the class of computing devices (which includes the computing device 102). Moreover, the graph control component 120 can update a dependency graph for the desired configuration state used by the at least one different computing device to be the modified dependency graph for the desired configuration state identified as being successful. Thus, after reconfiguration by the configuration source 104 and/or the computing device 102 to obtain a valid dependency graph with no errors, the configuration source 104 can identify other computing devices that have similar attributes and configuration requirements (e.g., in the same class of computing devices), and can update a dependency graph to be used by those computing devices. Accordingly, each of the computing devices in the class need not perform reconfiguration of a dependency graph.

In accordance with another example, the modified dependency graph for the desired configuration state can again be identified as being successful for the computing device 102 (e.g., no error is detected by the graph analysis component 142). The graph control component 120 can identify a different computing device as being in a different class of computing devices that differs from a class of computing devices that includes the computing device 102. Moreover, the configuration source 104 (e.g., the graph store 126) can lack a dependency graph for the different class of computing devices. The graph control component 120 can utilize the modified dependency graph for the desired configuration state (which is successful for the computing device 102) as a seed dependency graph for the desired configuration state to be reconfigured for the different computing device. Thus, when a new class of computing devices (e.g., with certain dependencies not applicable, dependencies in different orders, or new dependencies to be added) is managed by the configuration source 104, the learning process can enable creating a valid dependency graph utilizing the techniques described herein. Accordingly, new types of computing devices can be transitioned into an existing management infrastructure without significant manual onboarding efforts.

Pursuant to yet another illustration, the graph communication component 122 can receive feedback from computing devices (e.g., the computing device 102 and/or other computing devices) about not being able to correct an initial dependency graph (e.g., the feedback from the computing devices can specify that modified dependency graphs generated based on the initial dependency graph failed on the computing devices). The graph control component 120 can correlate the set of failures observed on the computing devices with other feedback from the computing devices and/or histories of the computing devices to learn about missing and incorrect configurations. Accordingly, the graph control component 120 can create a modified dependency graph. The graph communication component 122 can then push the modified dependency graph to the computing devices. The foregoing can be repeated, if needed (e.g., with the configuration source 104 and/or the computing devices further updating the modified dependency graph). Thus, a modified dependency graph that is able to successfully apply the configurations can be obtained (e.g., without manual reconfiguration of the dependency graph by an administrator and/or operating system update).

Figure 4:
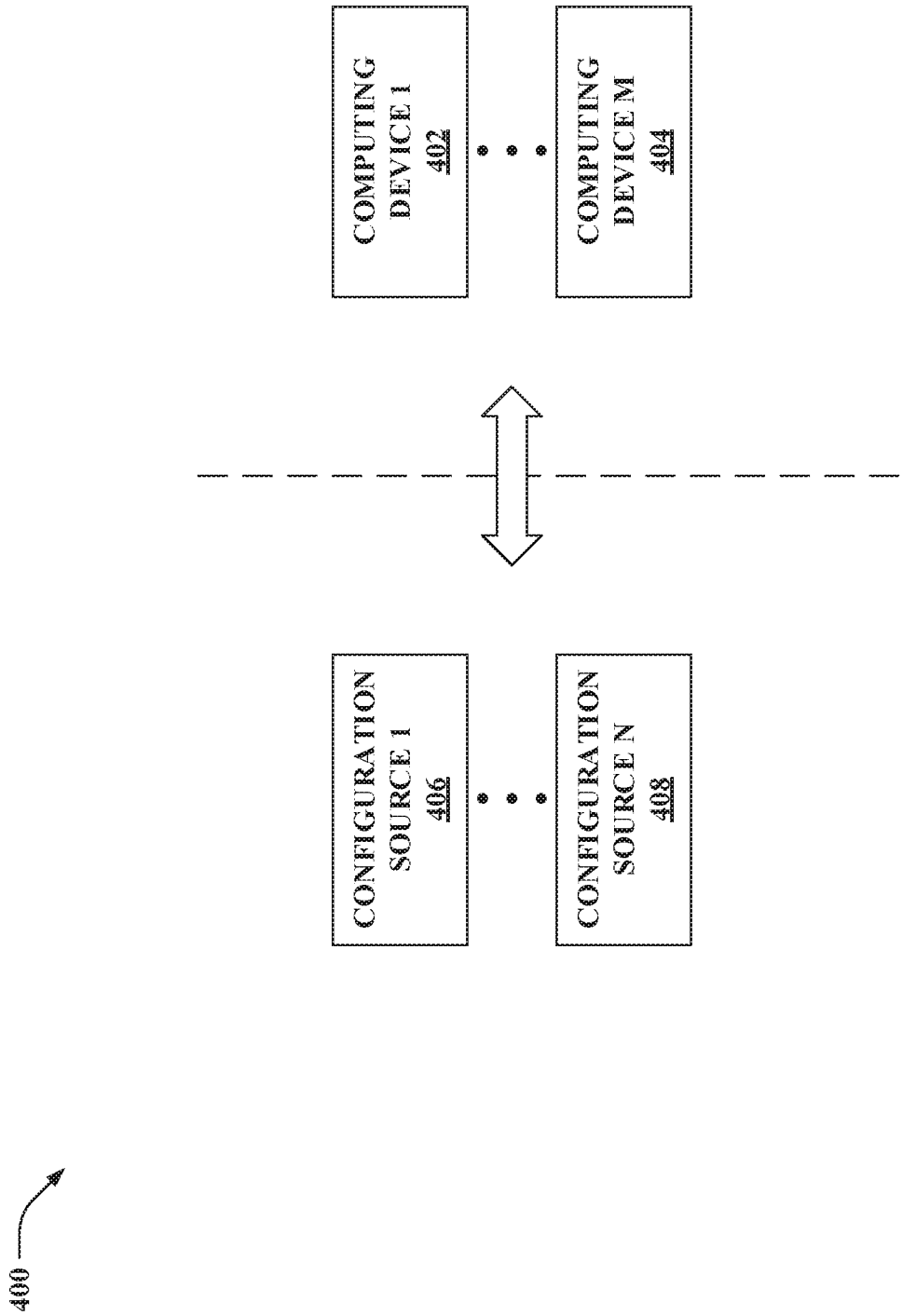
FIG. 4 illustrates a functional block diagram of yet another exemplary system that controls reconfiguring a dependency graph for coordinating configuration of the computing device.

Now turning to FIG. 4, illustrated is yet another system 400 that controls reconfiguring a dependency graph for coordinating configuration. The system 400 can include a plurality of computing devices, namely, a computing device 1 402, . . . , and a computing device M 404, where M can be substantially any integer greater than one (collectively referred to herein as computing devices 402-404). Moreover, the system 400 can include a plurality of configuration sources, namely, a configuration source 1 406, . . . , and a configuration source N 408, where N can be substantially any integer greater than one (collectively referred to herein as configuration sources 406-408). The computing devices 402-404 can each be substantially similar to the computing device 102, and the configuration sources 406-408 can each be substantially similar to the configuration source 104.

According to an illustration, the computing devices 402-404 can initially be enrolled in the configuration source 1 406. While enrolled in the configuration source 1 406, modified dependency graphs can be created for the computing devices 402-404 utilizing the techniques described herein. Thereafter, the configuration source N 408 can replace the configuration source 1 406 (e.g., due to failure of the configuration source 1 406, due to upgrading from the configuration source 1 406 to the configuration source N 408). When onboarding the configuration source N 408, rather than the modified dependency graphs having to be recreated, the configuration source N 408 can query the computing devices 402-404 to retrieve the modified dependency graphs. A graph communication component of the configuration source N 408 can receive the modified dependency graphs from the computing devices 402-404, which can thereafter be stored in a graph store of the configuration source N 408 and utilized as set forth herein. Accordingly, the configuration source N 408 can get the existing dependency graphs from the computing devices 402-404. Moreover, these existing dependency graphs can be further modified, if needed, by the computing devices 402-404 and/or the configuration source N 408 (e.g., due to differences between the configuration source N 408 and the configuration source 1 406).

Pursuant to another illustration, the configuration source 1 406 can manage a set of computing devices. Thereafter, a new class of computing device can be added to a portfolio managed by the configuration source 1 406 (e.g., the computing device M 404 can be added to the portfolio and can be a differing type of computing device compared to a remainder of the computing devices 402-404). The new class of computing device can have similar configuration needs for a desired configuration state (e.g., similar set of features), but a different ordering of the dependencies can be needed to correctly configure the new class of computing device. Following this illustration, the configuration source 1 406 can transmit an initial dependency graph (e.g., which can be tailored for one or more of the computing devices 402-404 other than the computing device M 404 utilizing the techniques set forth herein) to the computing device M 404. Further, a modified dependency graph can be created from the initial dependency graph for the computing device M 404 (e.g., the new type of computing device) by the computing device M 404 and/or the configuration source 1 406 to reach a desired configuration state (e.g., without an administrator needing to explicitly onboard the new type of computing device). This modified dependency graph can further be used for other computing devices of the new type.

Figure 5:
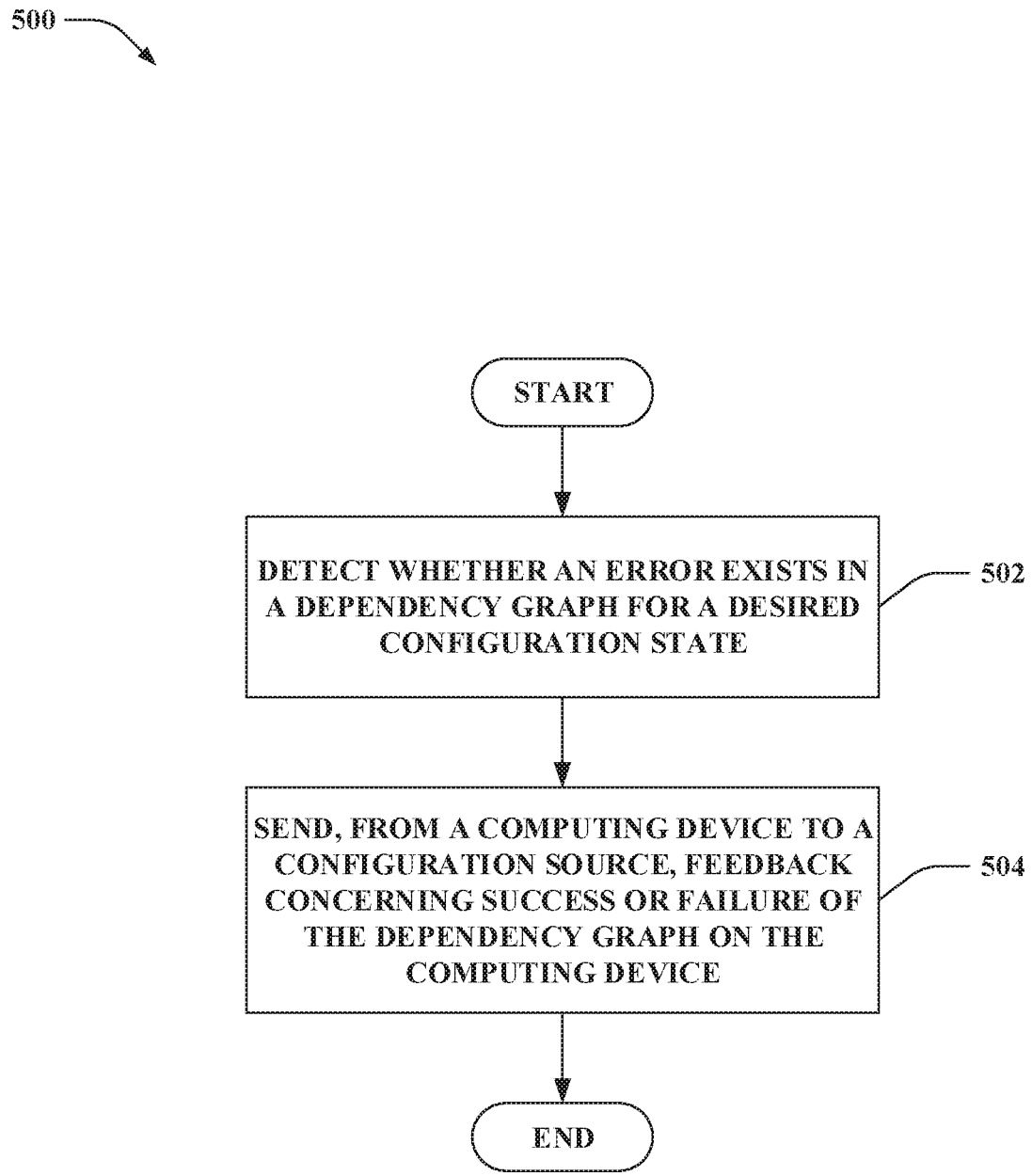
FIG. 5 is a flow diagram that illustrates an exemplary methodology of controlling reconfiguration of a dependency graph for coordinating reconfiguration of a computing device.
Figure 6:
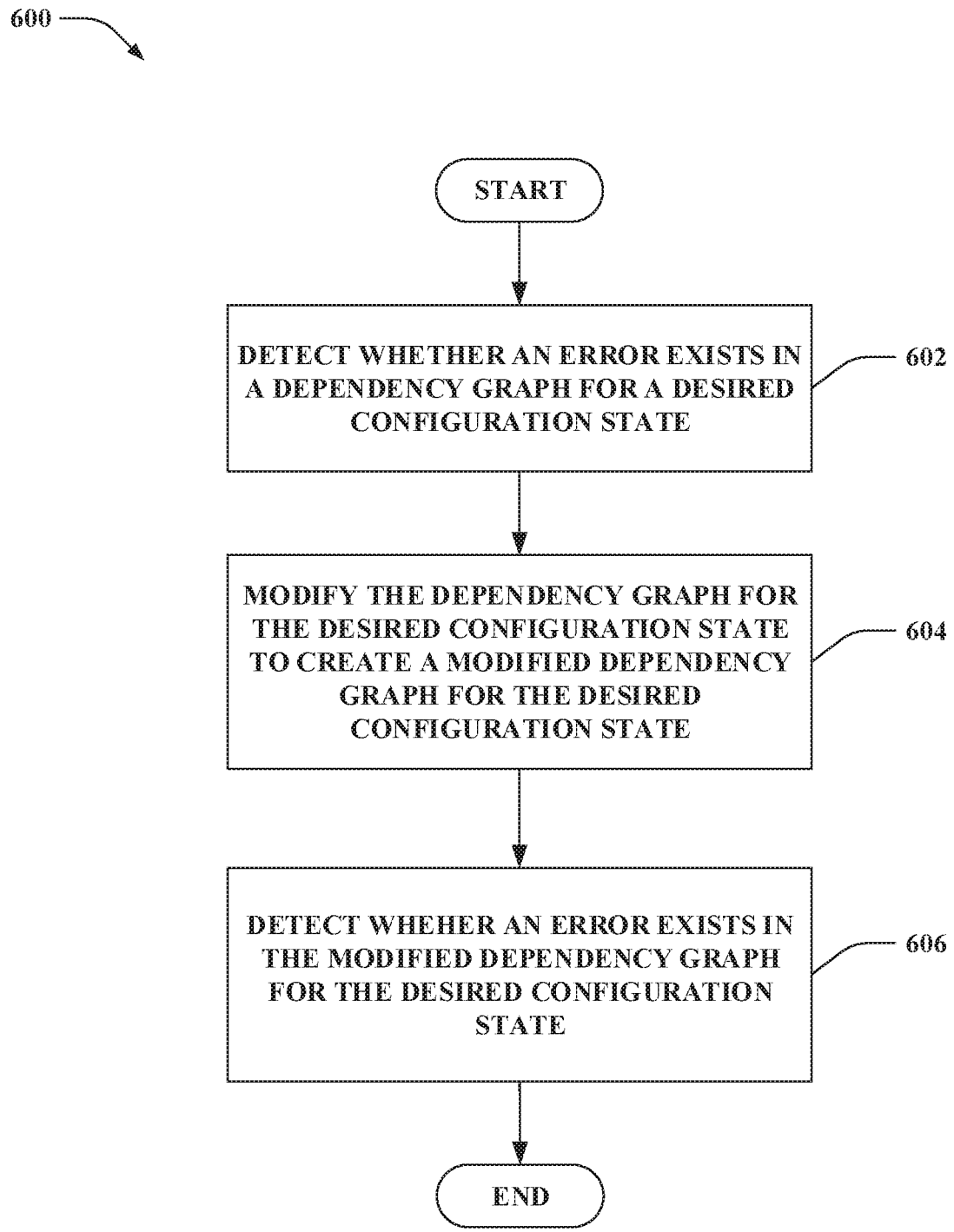
FIG. 6 is a flow diagram that illustrates another exemplary methodology of controlling reconfiguration of a dependency graph for coordinating reconfiguration of a computing device.
Figure 7:
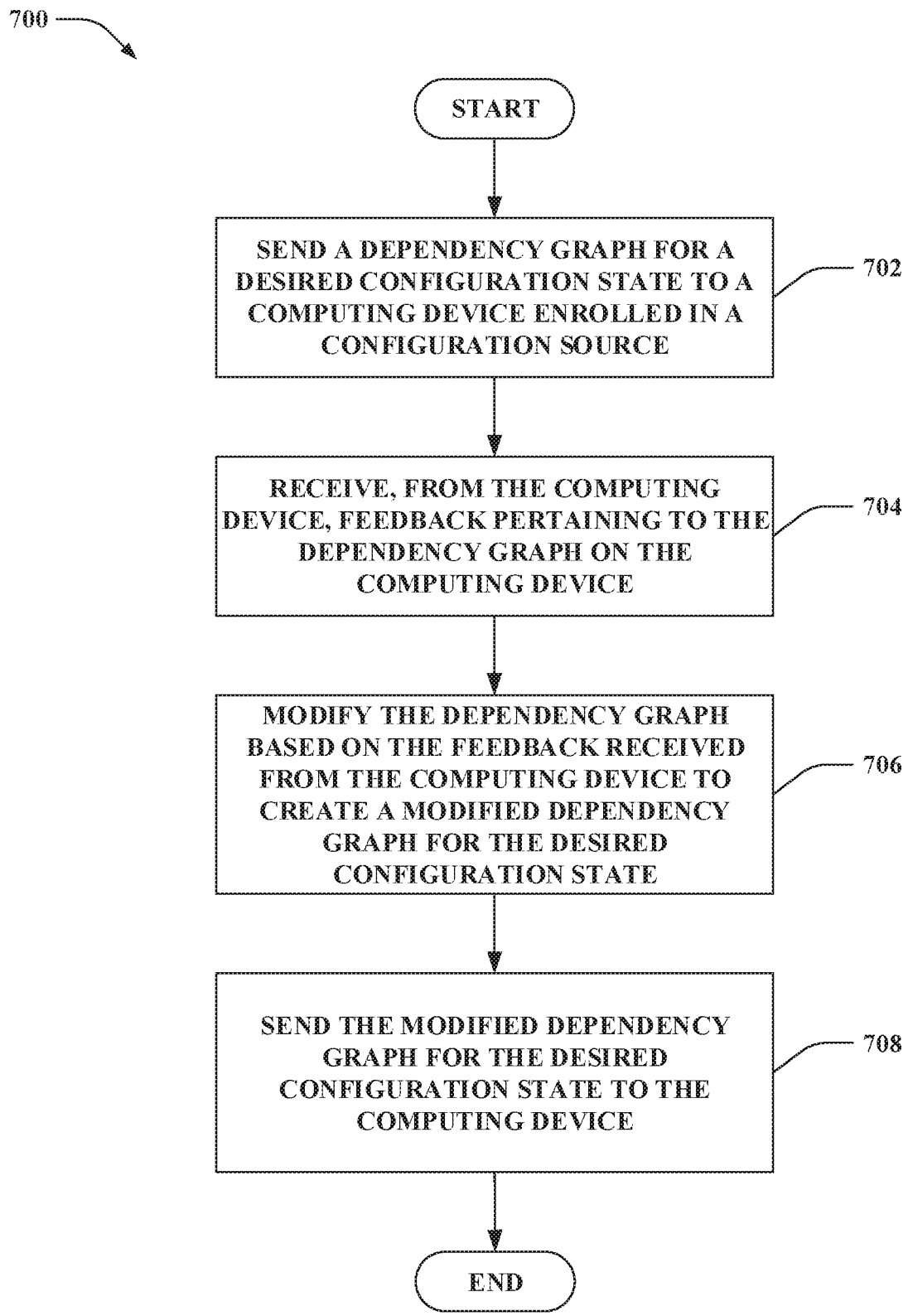
FIG. 7 is a flow diagram that illustrates yet another exemplary methodology of controlling reconfiguration of a dependency graph for coordinating reconfiguration of a computing device.

FIGS. 5-7 illustrate exemplary methodologies relating to controlling reconfiguration of a dependency graph for coordinating configuration of a computing device. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 5 illustrates a methodology 500 of controlling reconfiguration of a dependency graph for coordinating reconfiguration of a computing device. At 502, an operation can be performed at the computing device to detect whether an error exists in the dependency graph for a desired configuration state. The dependency graph for the desired configuration state can specify interdependencies between configurations of a set of features. An error can be detected to exist in the dependency graph when the desired configuration state differs from an actual configuration state of the computing device that results from use of the dependency graph to coordinate configuring the set of features. At 504, feedback concerning success or failure of the dependency graph on the computing device can be sent from the computing device to a configuration source. For example, when an error is detected in the dependency graph for the desired configuration state, a source of the error can be identified in the dependency graph, and feedback sent to the configuration source can include an indication of the source of the error detected in the dependency graph. Further, the dependency graph can be modified (e.g., by the computing device and/or the configuration source) based on whether an error is detected to exist in the dependency graph.

Turning now to FIG. 6, illustrated is another methodology 600 of controlling reconfiguration of a dependency graph for coordinating reconfiguration of a computing device. At 602, an operation can be performed at the computing device to detect whether an error exists in the dependency graph for a desired configuration state. At 604, when an error is detected in the dependency graph for the desired configuration state, the dependency graph for the desired configuration state can be modified by the computing device to create a modified dependency graph for the desired configuration state. At 606, an operation can be performed at the computing device to detect whether an error exists in the modified dependency graph for the desired configuration state. According to an example, the dependency graph can be iteratively modified by the computing device (e.g., up to a predefined maximum number of modification attempts can be performed by the computing device to try to create a successful modified dependency graph).

Referring now to FIG. 7, illustrated is yet another methodology 700 of controlling reconfiguration of a dependency graph for coordinating reconfiguration of a computing device. At 702, a dependency graph for a desired configuration state can be sent, from a configuration source, to a computing device enrolled in the configuration source. At 704, feedback pertaining to the dependency graph can be received from the computing device. At 706, the dependency graph can be modified based on the feedback received from the computing device to create a modified dependency graph for the desired configuration state. At 708, the modified dependency graph for the desired configuration state can be sent to the computing device.

Figure 8:
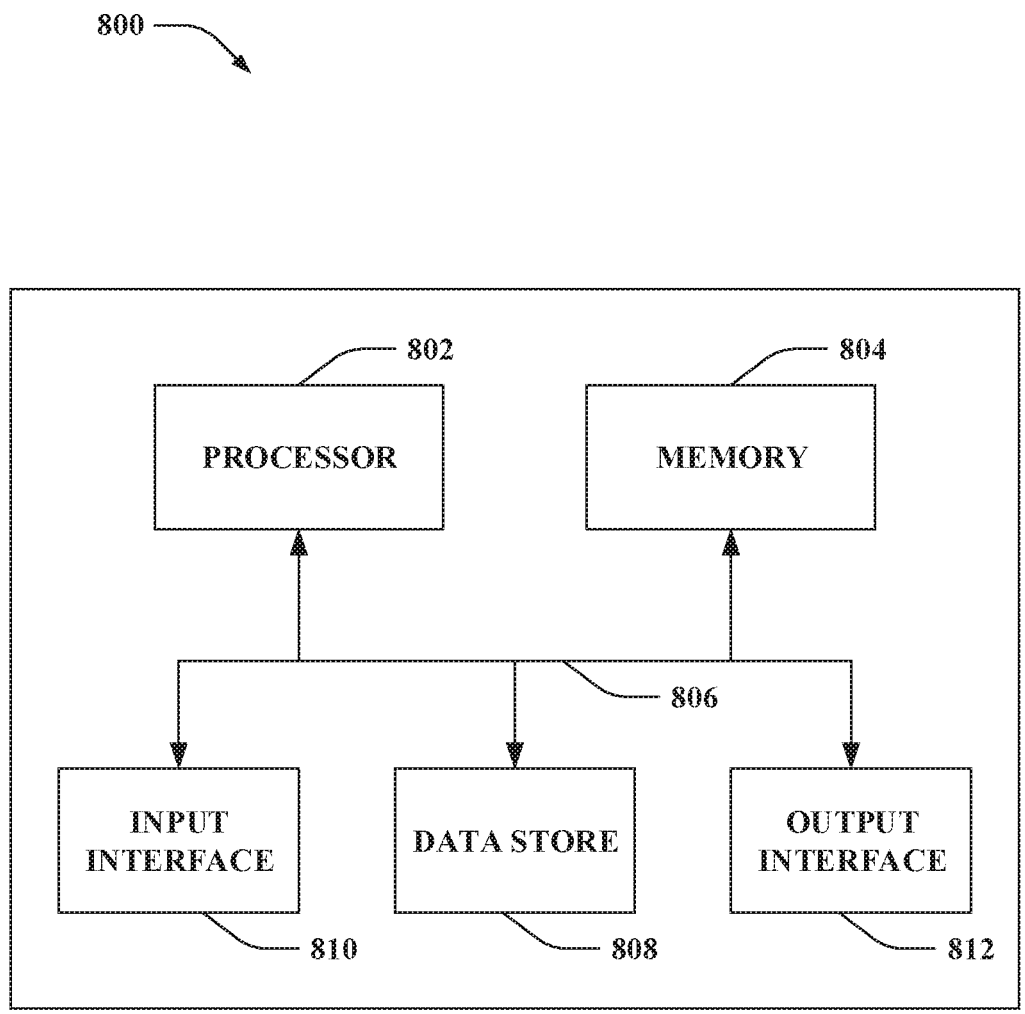
FIG. 8 illustrates an exemplary computing device.

Referring now to FIG. 8, a high-level illustration of an exemplary computing device 800 that can be used in accordance with the systems and methodologies disclosed herein is illustrated. For instance, the computing device 800 can be or include the computing device 102. According to another example, the computing device 800 can be or include one of the computing devices 402-404. By way of another example, the configuration source 104 may be or include the computing device 800. Pursuant to yet a further example, one of the configuration sources 406-408 may be or include the computing device 800. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store dependency graph(s), feedback, configuration states, values of policies, configuration data, and so forth.

The computing device 800 additionally includes a data store 808 that is accessible by the processor 802 by way of the system bus 806. The data store 808 may include executable instructions, dependency graph(s), feedback, configuration states, values of policies, configuration data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Figure 9:
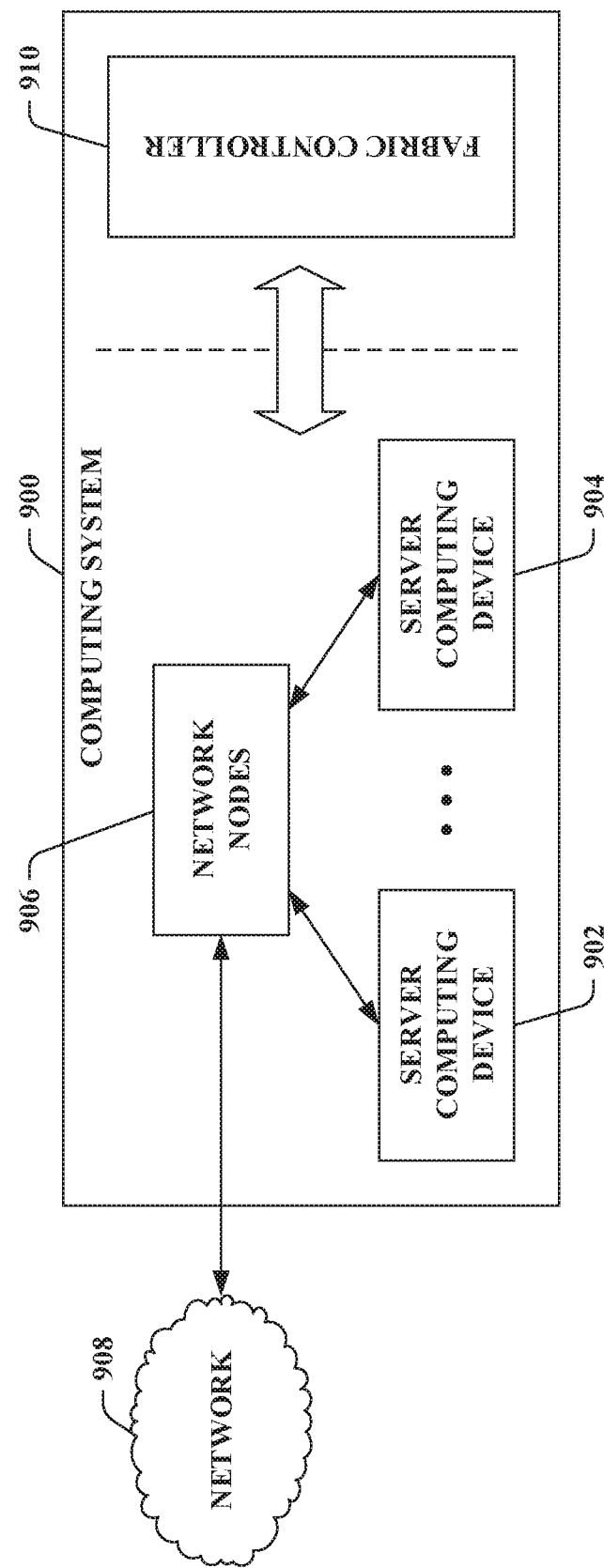
FIG. 9 illustrates an exemplary computing system.

Turning to FIG. 9, a high-level illustration of an exemplary computing system 900 that can be used in accordance with the systems and methodologies disclosed herein is illustrated. For instance, the computing system 900 can be or include the configuration source 104. Additionally or alternatively, the configuration source 104 can be or include the computing system 900.

The computing system 900 includes a plurality of server computing devices, namely, a server computing device 902, . . . , and a server computing device 904 (collectively referred to as server computing devices 902-904). The server computing device 902 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 902, at least a subset of the server computing devices 902-904 other than the server computing device 902 each respectively include at least one processor and a memory. Moreover, at least a subset of the server computing devices 902-904 include respective data stores.

Processor(s) of one or more of the server computing devices 902-904 can be or include the processor 116. Further, a memory (or memories) of one or more of the server computing devices 902-904 can be or include the memory 118. Moreover, a data store (or data stores) of one or more of the server computing devices 902-904 can be or include the data store 124.

The computing system 900 further includes various network nodes 906 that transport data between the server computing devices 902-904. Moreover, the network nodes 902 transport data from the server computing devices 902-904 to external nodes (e.g., external to the computing system 900) by way of a network 908. The network nodes 902 also transport data to the server computing devices 902-904 from the external nodes by way of the network 908. The network 908, for example, can be the Internet, a cellular network, or the like. The network nodes 906 include switches, routers, load balancers, and so forth.

A fabric controller 910 of the computing system 900 manages hardware resources of the server computing devices 902-904 (e.g., processors, memories, data stores, etc. of the server computing devices 902-904). The fabric controller 910 further manages the network nodes 906. Moreover, the fabric controller 910 manages creation, provisioning, de-provisioning, and supervising of virtual machines instantiated upon the server computing devices 902-904.

Various examples are now set forth.

Example 1

A method of controlling reconfiguration of a dependency graph for coordinating configuration of a computing device, comprising: detecting, at the computing device, whether an error exists in the dependency graph for a desired configuration state, wherein the dependency graph for the desired configuration state specifies interdependencies between configurations of a set of features, and wherein an error is detected to exist in the dependency graph when the desired configuration state differs from an actual configuration state of the computing device that results from use of the dependency graph to coordinate configuring the set of features; and sending, from the computing device to a configuration source, feedback concerning success or failure of the dependency graph on the computing device.

Example 2

The method according to Example 1, further comprising: when an error is detected in the dependency graph for the desired configuration state, identifying a source of the error in the dependency graph; wherein the feedback sent to the configuration source comprises an indication of the source of the error detected in the dependency graph.

Example 3

The method according to Example 2, further comprising: subsequent to sending the feedback that comprises the indication of the source of the error detected in the dependency graph, receiving a modified dependency graph for the desired configuration state from the configuration source at the computing device; detecting, at the computing device, whether an error exists in the modified dependency graph for the desired configuration state; and sending, from the computing device to the configuration source, feedback concerning success or failure of the modified dependency graph on the computing device.

Example 4

The method according to any of Examples 1-3, further comprising: receiving, at the computing device, the dependency graph for the desired configuration state from the configuration source.

Example 5

The method according to any of Examples 1-4, further comprising: modifying, at the computing device, the dependency graph for the desired configuration state to create a modified dependency graph for the desired configuration state; detecting, at the computing device, whether an error exists in the modified dependency graph for the desired configuration state; and sending, from the computing device to the configuration source, feedback concerning success or failure of the modified dependency graph on the computing device.

Example 6

The method according to Example 5, wherein modifying the dependency graph for the desired configuration state to create the modified dependency graph for the desired configuration state further comprises employing machine learning to at least one of learn a new dependency to include in the modified dependency graph, identify a non-applicable dependency to remove from the modified dependency graph, or reorder existing dependencies in the modified dependency graph.

Example 7

The method according to any of Examples 5-6, wherein the feedback sent from the computing device to the configuration source comprises the modified dependency graph for the desired configuration state.

Example 8

The method according to any of Examples 5-7, further comprising: subsequent to sending the feedback concerning the success or failure of the modified dependency graph on the computing device to the configuration source, receiving a further modified dependency graph for the desired configuration state from the configuration source at the computing device.

Example 9

The method according to any of Examples 1-8, further comprising: receiving, at the computing device, a configuration request from the configuration source, the configuration request comprising configuration data for a dependent feature in the set of features; evaluating, at the computing device, whether preconditions for the dependent feature specified in the dependency graph for the desired configuration state are satisfied; and configuring the dependent feature based on the configuration data when the preconditions for the dependent feature are satisfied, wherein the configuring of the dependent feature based on the configuration data is prohibited prior to the preconditions for the dependent feature being satisfied.

Example 10

A computing device, comprising: at least one processor; and memory that comprises computer-executable instructions that, when executed by the at least one processor, cause the at least one processor to perform acts including: detecting whether an error exists in a dependency graph for a desired configuration state, wherein the dependency graph for the desired configuration state specifies interdependencies between configurations of a set of features, and wherein an error is detected to exist in the dependency graph when the desired configuration state differs from an actual configuration state of the computing device that results from use of the dependency graph to coordinate configuring the set of features; and when an error is detected in the dependency graph for the desired configuration state, modifying the dependency graph for the desired configuration state to create a modified dependency graph for the desired configuration state.

Example 11

The computing device according to Example 10, wherein the memory further comprises computer-executable instructions that, when executed by the at least one processor, cause the at least one processor to perform acts including: sending the modified dependency graph for the desire configuration state to a configuration source in which the computing device is enrolled.

Example 12

The computing device according to any of Examples 10-11, wherein the memory further comprises computer-executable instructions that, when executed by the at least one processor, cause the at least one processor to perform acts including: receiving the dependency graph for the desired configuration state from a configuration source in which the computing device is enrolled.

Example 13

The computing device according to any of Examples 10-12, wherein the memory further comprises computer-executable instructions that, when executed by the at least one processor, cause the at least one processor to perform acts including: identifying a source of the error in the dependency graph; and sending feedback to a configuration source in which the computing device is enrolled, the feedback comprises an indication of the source of the error detected in the dependency graph.

Example 14

The computing device according to any of Examples 10-13, wherein the memory further comprises computer-executable instructions that, when executed by the at least one processor, cause the at least one processor to perform acts including: detecting whether an error exists in the modified dependency graph for the desired configuration state.

Example 15

The computing device according to any of Examples 10-14, wherein the modification of the dependency graph for the desired configuration state is automatically triggered.

Example 16

A configuration source, comprising: at least one processor; and memory that comprises computer-executable instructions that, when executed by the at least one processor, cause the at least one processor to perform acts including: sending a dependency graph for a desired configuration state to a computing device enrolled in the configuration source, the dependency graph for the desired configuration state specifies interdependencies between configurations of a set of features; receiving, from the computing device, feedback pertaining to the dependency graph on the computing device; modifying the dependency graph based on the feedback received from the computing device to create a modified dependency graph for the desired configuration state; and sending the modified dependency graph for the desired configuration state to the computing device.

Example 17

The configuration source according to Example 16, wherein the modified dependency graph for the desired configuration state is identified as being successful for the computing device, a class of computing devices comprises the computing device and at least one different computing device, the method further comprising: identifying the at least one different computing device as being in the class of computing devices; and updating a dependency graph for the desired configuration state used by the at least one different computing device to be the modified dependency graph for the desired configuration state identified as being successful.

Example 18

The configuration source according to any of Examples 16-17, wherein the modified dependency graph for the desired configuration state is identified as being successful for the computing device, the method further comprising: identifying a different computing device as being in a different class of computing devices that differs from a class of computing devices that comprises the computing device, wherein the configuration source lacks a dependency graph for the different class of computing devices; and utilizing the modified dependency graph for the desired configuration state as a seed dependency graph for the desired configuration state to be reconfigured for the different computing device.

Example 19

The configuration source according to any of Examples 16-18, wherein the feedback pertaining to the dependency graph received from the computing device comprises modifications of the dependency graph attempted by the computing device.

Example 20

The configuration source according to any of Examples 16-19, wherein the feedback pertaining to the dependency graph received from the computing device comprises an indication of a source of an error detected in the dependency graph by the computing device.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method performed by a computing device, comprising:
   receiving a configuration request from a configuration source, the configuration request comprising configuration data for a feature in a plurality of features;
   configuring the feature on the computing device based on:
      the configuration data; and
      a dependency graph for a particular configuration state specifying interdependencies between configurations of the plurality of features;
   detecting whether a difference exists between the particular configuration state and an actual configuration state of the computing device responsive to the plurality of features being configured on the computing device based on the dependency graph wherein the particular configuration state differing from the actual configuration state signifies an error in the dependency graph; and
   sending feedback to the configuration source, the feedback comprises an indication whether the dependency graph comprises the error on the computing device.

2. The method of claim 1, further comprising:
   when the error is in the dependency graph, identifying a source of the error in the dependency graph;
   wherein the feedback further comprises an indication of the source of the error detected in the dependency graph.

3. The method of claim 2, further comprising:
   subsequent to sending the feedback that comprises the indication of the source of the error in the dependency graph, receiving a modified dependency graph from the configuration source at the computing device;
   detecting whether an error exists in the modified dependency graph; and
   sending differing feedback to the configuration source, the differing feedback comprises an indication whether the modified dependency graph comprises the error on the computing device.

4. The method of claim 1, further comprising:
   receiving the dependency graph from the configuration source.

5. The method of claim 1, further comprising:
   modifying the dependency graph to create a modified dependency graph for the particular configuration state;
   detecting whether an error exists in the modified dependency graph; and
   sending differing feedback to the configuration source, the differing feedback comprises an indication whether the modified dependency graph comprises the error on the computing device.

6. The method of claim 5, wherein modifying the dependency graph to create the modified dependency graph further comprises employing machine learning to at least one of learn a new dependency to include in the modified dependency graph, identify a non-applicable dependency to remove from the modified dependency graph, or reorder existing dependencies in the modified dependency graph.

7. The method of claim 5, wherein the differing feedback sent from the computing device to the configuration source comprises the modified dependency graph.

8. The method of claim 5, further comprising:
   subsequent to sending the differing feedback to the configuration source, receiving a further modified dependency graph for the particular configuration state from the configuration source at the computing device.

9. The method of claim 1, wherein the feature is a dependent feature in the plurality of features, and wherein the configuring of the feature on the computing device based on the configuration data and the dependency graph for the particular configuration state further comprises:
   evaluating whether preconditions for the dependent feature specified in the dependency graph for the particular configuration state are satisfied; and
   configuring the dependent feature based on the configuration data when the preconditions for the dependent feature are satisfied, wherein the configuring of the dependent feature based on the configuration data is prohibited prior to the preconditions for the dependent feature being satisfied.

10. A computing device, comprising:
    at least one processor; and
    memory that comprises computer-executable instructions that, when executed by the at least one processor, cause the at least one processor to perform acts including:
       receiving a configuration request from a configuration source in which the computing device is enrolled, the configuration request comprising configuration data for a feature in a plurality of features;
       configuring the feature on the computing device based on:
          the configuration data, and
          a dependency graph for a particular configuration state specifying interdependencies between configurations of the plurality of features;
       detecting whether a difference exists between the particular configuration state and an actual configuration state of the computing device responsive to the plurality of features being configured on the computing device based on the dependency graph, wherein the particular configuration state differing from the actual configuration state signifies an error in the dependency graph; and
       when the error is detected in the dependency graph, modifying the dependency graph to create a modified dependency graph for the particular configuration state.

11. The computing device of claim 10, wherein the memory further comprises computer-executable instructions that, when executed by the at least one processor, cause the at least one processor to perform acts including:

sending the modified dependency graph to the configuration source in which the computing device is enrolled.

12. The computing device of claim 10, wherein the memory further comprises computer-executable instructions that, when executed by the at least one processor, cause the at least one processor to perform acts including:
receiving the dependency graph from the configuration source in which the computing device is enrolled.

13. The computing device of claim 10, wherein the memory further comprises computer-executable instructions that, when executed by the at least one processor, cause the at least one processor to perform acts including:
identifying a source of the error in the dependency graph; and
sending feedback to the configuration source in which the computing device is enrolled, the feedback comprises an indication of the source of the error detected in the dependency graph.

14. The computing device of claim 10, wherein the memory further comprises computer-executable instructions that, when executed by the at least one processor, cause the at least one processor to perform acts including:
detecting whether an error exists in the modified dependency graph.

15. The computing device of claim 10, wherein the modification of the dependency graph is automatically triggered.

16. A configuration source, comprising:
at least one processor; and
memory that comprises computer-executable instructions that, when executed by the at least one processor, cause the at least one processor to perform acts including:
sending a dependency graph for a particular configuration state to a computing device enrolled in the configuration source, the dependency graph specifies interdependencies between configurations of a plurality of features;
sending a configuration request comprising configuration data for a feature in the plurality of features to the computing device, the configuration request causes the feature to be configured on the computing device based on the configuration data and the dependency graph;
receiving, from the computing device, feedback pertaining to the dependency graph on the computing device;
modifying the dependency graph based on the feedback received from the computing device to create a modified dependency graph for the particular configuration state; and
sending the modified dependency graph to the computing device.

17. The configuration source of claim 16, wherein the modified dependency graph is identified as being successful for the computing device, a class of computing devices comprises the computing device and at least one different computing device, the acts further including:
identifying the at least one different computing device as being in the class of computing devices; and
updating a dependency graph for the particular configuration state used by the at least one different computing device to be the modified dependency graph identified as being successful.

18. The configuration source of claim 16, wherein the modified dependency graph is identified as being successful for the computing device, the acts further including:
identifying a different computing device as being in a different class of computing devices that differs from a class of computing devices that comprises the computing device, wherein the configuration source lacks a dependency graph for the different class of computing devices; and
utilizing the modified dependency graph as a seed dependency graph for the particular configuration state to be reconfigured for the different computing device.

19. The configuration source of claim 16, wherein the feedback pertaining to the dependency graph received from the computing device comprises modifications of the dependency graph attempted by the computing device.

20. The configuration source of claim 16, wherein the feedback pertaining to the dependency graph received from the computing device comprises an indication of a source of an error detected in the dependency graph by the computing device.

* * * * *